United States Patent
Price Hoelscher et al.

(10) Patent No.: US 9,970,246 B2
(45) Date of Patent: May 15, 2018

(54) TRIGGERED HEATING OF WELLBORE FLUIDS BY CARBON NANOMATERIALS

(71) Applicant: M-I L.L.C., Houston, TX (US)

(72) Inventors: Brandi Katherine Price Hoelscher, Houston, TX (US); Steven Philip Young, Cypress, TX (US); James Friedheim, Spring, TX (US)

(73) Assignee: M-I L.L.C., Houston, TX (US)

( * ) Notice: Subject to any disclaimer, the term of this patent is extended or adjusted under 35 U.S.C. 154(b) by 318 days.

(21) Appl. No.: 14/391,597

(22) PCT Filed: Apr. 9, 2013

(86) PCT No.: PCT/US2013/035758
§ 371 (c)(1),
(2) Date: Oct. 9, 2014

(87) PCT Pub. No.: WO2013/155061
PCT Pub. Date: Oct. 17, 2013

(65) Prior Publication Data
US 2015/0114646 A1    Apr. 30, 2015

Related U.S. Application Data

(60) Provisional application No. 61/621,716, filed on Apr. 9, 2012.

(51) Int. Cl.
*E21B 21/00* (2006.01)
*E21B 33/138* (2006.01)
(Continued)

(52) U.S. Cl.
CPC ............ *E21B 21/003* (2013.01); *C09K 8/032* (2013.01); *C09K 8/06* (2013.01); *C09K 8/52* (2013.01);
(Continued)

(58) Field of Classification Search
CPC ...... E21B 21/003; E21B 33/138; E21B 36/04; E21B 43/2401; C09K 8/032; C09K 8/06; C09K 8/52
See application file for complete search history.

(56) References Cited

U.S. PATENT DOCUMENTS

| | | |
|---|---|---|
| 4,374,771 A | 2/1983 | Singh et al. |
| 4,637,956 A | 1/1987 | Das et al. |

(Continued)

FOREIGN PATENT DOCUMENTS

| | | |
|---|---|---|
| EP | 2110508 A1 | 10/2009 |
| WO | 2006/043022 A1 | 4/2006 |

(Continued)

OTHER PUBLICATIONS

Office Action dated Feb. 21, 2017, by the U.S. Patent and Trademark Office in corresponding U.S. Appl. No. 14/509,567 (8 pages).

(Continued)

*Primary Examiner* — Silvana C Runyan
(74) *Attorney, Agent, or Firm* — Osha Liang LLP

(57) ABSTRACT

A method of triggering heating within a subterranean formation, that includes introducting a wellbore fluid containing a dispersed carbon nanomaterial into a wellbore through the subterranean formation; lowering a microwave or ultraviolet radiation source into the wellbore; and irradiating the wellbore with microwave or ultraviolet radiation, thereby increasing the temperature of the wellbore fluid and/or wellbore is disclosed.

18 Claims, 5 Drawing Sheets

(51) Int. Cl.
  *E21B 43/24* (2006.01)
  *C09K 8/06* (2006.01)
  *C09K 8/52* (2006.01)
  *E21B 7/14* (2006.01)
  *E21B 36/04* (2006.01)
  *C09K 8/03* (2006.01)

(52) U.S. Cl.
  CPC .............. *E21B 7/14* (2013.01); *E21B 33/138* (2013.01); *E21B 36/04* (2013.01); *E21B 43/2401* (2013.01); *C09K 2208/10* (2013.01)

(56) References Cited

U.S. PATENT DOCUMENTS

| | | | |
|---|---|---|---|
| 4,767,829 A | 8/1988 | Kordomenos et al. | |
| 4,817,711 A * | 4/1989 | Jeambey | E21B 43/2401 166/248 |
| 4,870,141 A | 9/1989 | Kordomenos | |
| 4,976,833 A | 12/1990 | Debroy et al. | |
| 5,108,458 A | 4/1992 | Marumoto et al. | |
| 5,405,688 A | 4/1995 | Decker et al. | |
| 5,559,064 A | 9/1996 | Tsuchinari et al. | |
| 5,981,447 A * | 11/1999 | Chang | C09K 8/512 166/295 |
| 6,153,719 A | 11/2000 | Abbey et al. | |
| 6,214,175 B1 | 4/2001 | Heinemann et al. | |
| 6,242,083 B1 | 6/2001 | McGrail et al. | |
| 6,288,176 B1 | 9/2001 | Hsieh et al. | |
| 6,300,286 B1 | 10/2001 | Dobson, Jr. et al. | |
| 6,572,971 B2 | 6/2003 | Martin | |
| 6,608,005 B2 | 8/2003 | Palmer et al. | |
| 6,632,893 B2 | 10/2003 | Konarski et al. | |
| 6,877,563 B2 | 4/2005 | Todd et al. | |
| 7,037,958 B1 | 5/2006 | Hansen et al. | |
| 7,152,697 B2 | 12/2006 | Horton et al. | |
| 7,157,527 B2 | 1/2007 | Kuntimaddi et al. | |
| 7,163,973 B2 | 1/2007 | Ahsan | |
| 7,497,278 B2 | 3/2009 | Schriener et al. | |
| 7,504,518 B2 | 3/2009 | Miyata et al. | |
| 7,527,103 B2 | 5/2009 | Huang et al. | |
| 7,531,114 B2 | 5/2009 | Fukushima et al. | |
| 7,592,050 B2 | 9/2009 | Watanabe et al. | |
| 7,727,938 B2 | 6/2010 | Ballard | |
| 8,122,950 B2 | 2/2012 | Daniel et al. | |
| 2002/0028932 A1 | 3/2002 | Loontjens et al. | |
| 2003/0004282 A1 | 1/2003 | Kamikado et al. | |
| 2003/0194635 A1 | 10/2003 | Mulligan | |
| 2004/0040706 A1 | 3/2004 | Hossaini et al. | |
| 2004/0152601 A1 | 8/2004 | Still et al. | |
| 2004/0236021 A1 | 11/2004 | Faecke et al. | |
| 2005/0161219 A1 | 7/2005 | Hossaini et al. | |
| 2005/0171237 A1 | 8/2005 | Patel et al. | |
| 2005/0187314 A1 | 8/2005 | Anderson et al. | |
| 2005/0205266 A1 | 9/2005 | Todd et al. | |
| 2006/0122357 A1 | 6/2006 | Faecke et al. | |
| 2006/0148391 A1 | 7/2006 | Ono et al. | |
| 2006/0281854 A1 | 12/2006 | Imamura et al. | |
| 2006/0293172 A1 | 12/2006 | Rubinsztajn et al. | |
| 2007/0009750 A1 | 1/2007 | Ito et al. | |
| 2007/0023288 A1 | 2/2007 | Kuwano et al. | |
| 2007/0032386 A1 | 2/2007 | Abad et al. | |
| 2007/0049501 A1 | 3/2007 | Saini et al. | |
| 2007/0249504 A1 | 10/2007 | Ballard | |
| 2007/0287767 A1 | 12/2007 | Ballard | |
| 2008/0006912 A1 | 1/2008 | Hsu et al. | |
| 2008/0062921 A1 | 3/2008 | Lakkis | |
| 2008/0119374 A1 | 5/2008 | Willberg et al. | |
| 2008/0200354 A1 | 8/2008 | Jones et al. | |
| 2008/0289827 A1 | 11/2008 | Welton et al. | |
| 2009/0137429 A1 | 5/2009 | Rimassa et al. | |
| 2009/0260818 A1 | 10/2009 | Daniel et al. | |
| 2009/0288820 A1 | 11/2009 | Barron et al. | |
| 2010/0012094 A1 | 1/2010 | O'Leary | |
| 2010/0087566 A1 | 4/2010 | Ballard | |
| 2010/0263867 A1 | 10/2010 | Horton et al. | |
| 2010/0300759 A1 | 12/2010 | Passade-Boupat et al. | |
| 2010/0300967 A1 | 12/2010 | Dakin et al. | |
| 2011/0003907 A1 | 1/2011 | Choi et al. | |
| 2011/0048713 A1 | 3/2011 | Lewis et al. | |
| 2011/0183873 A1 | 7/2011 | Bailey et al. | |
| 2012/0015852 A1 * | 1/2012 | Quintero | C09K 8/032 507/112 |
| 2012/0032543 A1 | 2/2012 | Chakraborty et al. | |
| 2012/0181033 A1 * | 7/2012 | Saini | C04B 28/02 166/308.1 |
| 2013/0213638 A1 * | 8/2013 | Keller | C04B 28/02 166/248 |

FOREIGN PATENT DOCUMENTS

| | | |
|---|---|---|
| WO | 2008/096164 A2 | 8/2008 |
| WO | 2009/020829 A1 | 2/2009 |
| WO | 2009/106987 A1 | 9/2009 |
| WO | 2010/015639 A1 | 2/2010 |
| WO | 2011/039544 A1 | 4/2011 |
| WO | WO 2012057910 A2 * | 5/2012 ............ C04B 28/02 |

OTHER PUBLICATIONS

International Search Report and Written Opinion dated Jul. 2, 2013, issued by the Korean Intellectual Property Office in corresponding International Application No. PCT/US2013/035758 (9 pages).
PCT International Preliminary Report on Patentability and Written Opinion dated Oct. 14, 2014, by The International Bureau of WIPO, in corresponding International Application No. PCT/US2013/035758 (6 pages).
Higginbotham, Amanda L, et al., "Carbon nanotube composite curing through absorption of microwave radiation"; Composites Science and Technology, vol. 68, Issue15-16 (2008); pp. 3087-3092.
Paton, Keith R., et al., "Efficient microwave energy absorption by carbon nanotubes"; Carbon, No. 46 (2008); pp. 1935-1941.
Imholt, T. J., et al., "Nanotubes in Microwave Fields: Light Emission, Intense Heat, Outgassing, and Reconstruction"; Chemical Materials, vol. 15 (2003); pp. 3969-3970.
Roberts, J.A., et al., "Electromagnetic wave properties of polymer blends of single wall carbon nanotubes using a resonant microwave cavity as a probe"; Journal of Applied Physics, vol. 95, No. 8, Apr. 15, 2004; pp. 4352-4356.
PCT International Search Report dated Feb. 29, 2012, in corresponding International Application No. PCT/US2011/041983 (4 pages).
Patent Examination Report No. 1 dated Apr. 3, 2014, in corresponding Australian Patent Application No. AU-2011372058 (3 pages).
Extended European Search Report dated Sep. 9, 2015, in corresponding European Application No. EP-13776067.4 (7 pages).
Examiner Requisition (Office Action) dated Jan. 7, 2016, in corresponding Canadian Application No. Ca 2,869,973 (3 pages).
Examination Report dated Jun. 7, 2017, in corresponding United Kingdom Application No. GB1400074.9 (5 pages).

* cited by examiner

TRIGGERED HEATING OF WELLBORE FLUIDS BY CARBON NANOMATERIALS

TECHNICAL FIELD

Embodiments disclosed herein relate to the use of carbon-based nanomaterials for use as radiation sensitizers or susceptors to heat a wellbore fluid system upon exposure to a radiation source.

BACKGROUND

During the drilling of a wellbore, various fluids are used in the well for a variety of functions. The fluids may be circulated through a drill pipe and drill bit into the wellbore, and then may subsequently flow upward through the wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

As stated above, wellbore fluids are circulated downhole to remove rock, as well as deliver agents to combat the variety of issues described above. Fluid compositions may be water- or oil-based and may comprise weighting agents, surfactants, proppants, viscosifiers, fluid loss additives, and polymers. However, for a wellbore fluid to perform all of its functions and allow wellbore operations to continue, the fluid must stay in the borehole. Frequently, undesirable formation conditions are encountered in which substantial amounts or, in some cases, practically all of the wellbore fluid may be lost to the formation. For example, wellbore fluid may leave the borehole through large or small fissures or fractures in the formation, or a highly porous rock matrix surrounding the borehole.

One way of protecting the formation is by forming a filtercake on the surface of the subterranean formation. Filtercakes are formed when particles suspended in a wellbore fluid coat and plug the pores in the subterranean formation such that the filtercake prevents or reduce both the loss of fluids into the formation and the influx of fluids present in the formation. A number of ways of forming filtercakes are known in the art, including the use of bridging particles, cuttings created by the drilling process, polymeric additives, and precipitates. Fluid loss pills may also be used where a viscous pill comprising a polymer may be used to reduce the rate of loss of a wellbore fluid to the formation through its viscosity Upon completion of drilling, the filtercake and/or fluid loss pill may stabilize the wellbore during subsequent completion operations such as placement of a gravel pack in the wellbore. Additionally, during completion operations, when fluid loss is suspected, a fluid loss pill of polymers may be spotted into to reduce or prevent such fluid loss by injection of other completion fluids behind the fluid loss pill to a position within the wellbore which is immediately above a portion of the formation where fluid loss is suspected. Injection of fluids into the wellbore is then stopped, and fluid loss will then move the pill toward the fluid loss location.

After any completion operations have been accomplished, removal of filtercake (formed during drilling and/or completion) remaining on the sidewalls of the wellbore may be necessary. Although filtercake formation and use of fluid loss pills may be used in drilling and completion operations, the barriers may be a significant impediment to the production of hydrocarbon or other fluids from the well if, for example, the rock formation is still plugged by the barrier. Because filtercake is compact, it often adheres strongly to the formation and may not be readily or completely flushed out of the formation by fluid action alone.

To remove filtercakes and fluid loss pills prior to production, breaker fluids are introduced to the wellbore to remove residual filtercake and fluid loss pills. Breaker fluids may contain, for example, solvents, acids, oxidizers, or enzymes, and destroy the integrity of a residual filtercake created during the drilling process by removing some or all fluid components that form the filtercake or fluid loss pill.

As mentioned above, when filtercakes form the particles suspended in a wellbore fluid coat and plug the pores in the subterranean formation such that the filtercake prevents or reduces both the loss of fluids into the formation and the influx of fluids present in the formation. However, weak zones in the formation may be encountered during drilling due to the heterogeneous nature of certain formations. The formation of weak zones during drilling may lead to additional fluid loss, pressures changes, and well cave-ins. Because these weak zones are detrimental to drilling, such zones must be strengthened before drilling work can resume, resulting in increased operation costs. Further, lost circulation of the drilling fluid is a recurring drilling problem, characterized by loss of drilling fluid into downhole formations that are fractured, highly permeable, porous, cavernous, or vugular.

Weak zones within a wellbore may be strengthened, for example, during drilling by chemically modifying the filtercake, to form a chemical casing while drilling or by employing separately applied fluid treatments that are pumped into the weak zone and allowed to cure and develop strength over time. Such treatments have included polymeric composites and cement compositions, which are also used in primary cementing operations, as a lost circulation treatment and/or in zonal isolations.

SUMMARY

In one aspect, embodiments disclosed herein relate to a method of triggering heating within a subterranean formation, that includes introducing a wellbore fluid containing a dispersed carbon nanomaterial into a wellbore through the subterranean formation; lowering a microwave or ultraviolet radiation source into the wellbore; and irradiating the wellbore with microwave or ultraviolet radiation, thereby increasing the temperature of the subterranean formation.

This summary is provided to introduce a selection of concepts that are further described below in the detailed description. This summary is not intended to identify key or essential features of the claimed subject matter, nor is it intended to be used as an aid in limiting the scope of the claimed subject matter.

DETAILED DESCRIPTION

Figure 1:
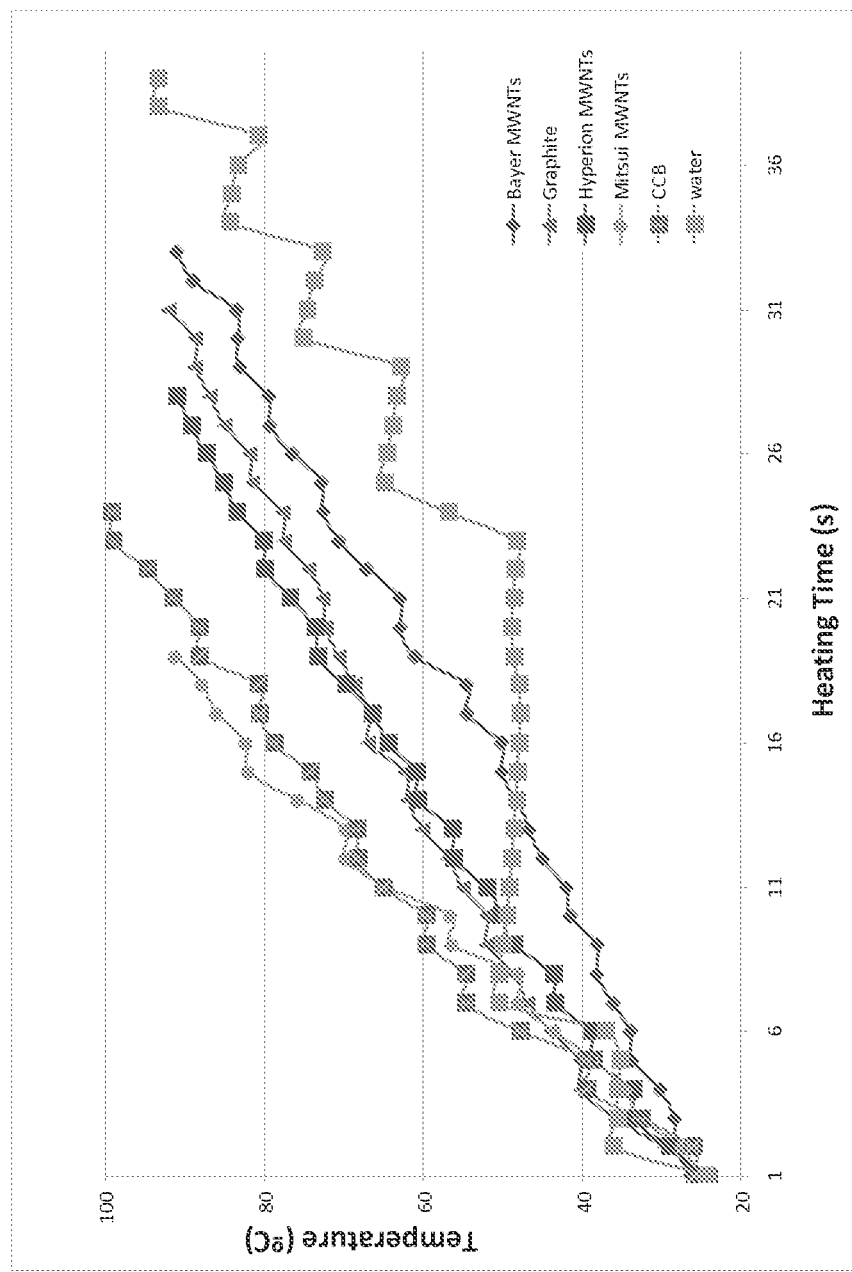
FIGS. 1-4 present graphical data related to the radiation-induced heating of various solvent systems containing carbon nanomaterials.

In one aspect, embodiments disclosed herein relate to carbon nanomaterials for wellbore fluid applications. Carbon nanomaterials may be advantageously incorporated into wellbore fluids as a sensitizer or susceptor to heat fluids in a downhole environment. Carbon nanomaterials disclosed herein are responsive to a broad range of electromagnetic radiation including ultraviolet, microwave, and other wavelengths of electromagnetic radiation, which include gamma and radio waves. The heat generated by the carbon nanomaterials may be used to trigger polymerization of components in a wellbore fluid in a wellbore strengthening application, to aid in breaking of filtercakes formed on wellbore walls or consolidated wellbore strengthening compositions, and to disrupt fluid loss pills.

Carbon Nanomaterials

Since their discovery, carbon nanomaterials such as graphene, graphite, carbon black, and the family of fullerenes have been useful for many industrial applications as additives that possess unique mechanical, optical, and chemical features. Many carbon nanomaterials are formed from the carbon allotrope graphene, a planar array of $sp^2$ bonded carbon atoms that form an interconnected network of five-, six- and seven-membered rings. Under certain conditions graphene has been shown to form a family of three-dimensional structures known as fullerenes, which encompasses Buckminsterfullerene, carbon nanotubes, and other carbon nanostructures. Carbon nanomaterials may also be synthesized by a number of methods well known in the art, for example, synthesized from xylenes and ferrocene catalysts or isolated from residues deposited at high temperatures and high vacuum, etc.

Carbon nanomaterials within this disclosure include, for example, graphite, graphene, graphene oxide, glassy carbon, carbon nanofoam, silicon carbide, buckminsterfullerene, buckypaper, nanofiber, nanoplatelets, nano-onions, nanoribbons, nanohorns, single- or multi-walled carbon nanotubes, nano-hybrids, and derivatives thereof.

In some embodiments, carbon nanomaterials may be selected from a wide range of sizes, molecular weights, and suppliers. For example, multi-layered graphene sheets are available in diameters that may range from 150-30,000 nm, with a range of thicknesses that may range from 0.5-100 nm.

High aspect ratio graphene cylinders, often referred to as carbon nanotubes, are classified generally as single- and multi-walled. Single-walled nanotubes (SWNT) are composed of a single graphitic cylinder where the diameter may vary from 0.7 to 2 nm while the length may range from 50 nm to several centimeters. Multiwall nanotubes (MWNTs) are composed of several concentric graphitic layers, where diameter may vary from 10 to 200 nm with lengths from 1 micron to several centimeters. In an embodiment, the carbon nanomaterials used in the present wellbore fluids may have at least one dimension falling in the range from 0.5-300 nm. While a number of size ranges have been included for illustrative purposes, this is not meant to limit the disclosure.

The rigid arrangement of $sp^2$ carbon-carbon bonds within the nanomaterials give these structures high tensile strength, up to 63 GPa, and a Young's moduli as high as 1 TPa. As a comparison, steel has a tensile strength of 0.4 GPa and a modulus of 0.2 TPa. Because of their high rigidity and low weight to strength ratio, nanomaterials have been used to create composites from polymers, ceramics, and metals for a variety of applications. However, the present disclosure focuses on the electromagnetic properties of carbon nanomaterials, in particular the ability of carbon nanomaterials to absorb a broad spectrum of electromagnetic radiation, including wavelengths that may range from the ultraviolet to the radiowave regions of the electromagnetic spectrum.

In order to increase the solubility of nanomaterials in various solvents and polymer systems, and reduce aggregate formation, chemical dispersants or covalent modification of the surfaces of the nanomaterials with functional groups may be used to increase their oil or water solubility and/or dispersablitiy in a wellbore fluid. Water-based dispersants include polyethylene glycol p-(1,1,3,3-tetramethylbutyl)-phenyl ether, sodium dodecyl benzene sulfonate (SDBS), sodium dodecyl sulfate (SDS), dodecyl trimethyl ammonium bromide, cetyl trimethyl ammonium bromide, sodium alkyl sulfosuccinate, polystyrene sulfonate, sodium n-lauroylsarcosinate, polyvinyl pyrrolidone, poloxamers, such as Pluronic™, polyethylene oxide/polybutylene oxide triblock copolymers, polysorbate detergents such as polyoxyethylene sorbitan monolaurate, polyoxyethylene sorbitan monooleate, and the like. To a more limited extent, effective dispersants of nanomaterials within organic solvents include polyisobutene succinimide, polythiophene and copolymers of thiophene and 3-hexylthiophene, as described in U.S. Pat. Pub. No. 2011/0003907, which are incorporated herein by reference.

Further, it has been shown that nanomaterials also exhibit solubility in ionic liquids. Ionic liquids are solutions formed from electrolytes that in many instances have melting temperatures near room temperature. Ionic liquids may be formed, for example, from salts of quaternary nitrogen containing compounds (forming the cation) and a Lewis acid or non-Lewis acid (forming the anion). Ionic liquid forming cations may be selected from pyridinium, pyridazinium, thiazolium, sulfonium, phosphonium, oxazolium, pyrimidinium, triazolium, pyrazolium, imidazolium, quaternized alkyl imidazoline, dialkyl imidazolium, ethylmethyl imidazolium, or derivatives thereof. Anions may be selected from, for example, alkylsulfates, alkylsulfonates, ethyl sulfonate, tosylate, methanesulfonate, bis(trifluoromethylsulfonyl)imide, $AlCl_4^-$, $BF_4^-$, $PF_6^-$, $SbF_6^-$, $CF_3SO_3^-$, $CuCl_2^-$, $Cu_2Cl_3^-$, $Cu_3Cl_4^-$, $NO_3^-$, $(CF_3SO_2)_2N^-$, $Br^-$, $Cl^-$, $ClO_4^-$, $CH_3COO^-$, and $BPh_4^-$. Suitable ionic liquids used as wellbore fluids are disclosed in U.S. Pat. Nos. 6,608,005, 7,531,114 and 7,592,050 which are incorporated herein by reference. Any of such dispersants or solvents may be used in the wellbore fluids of the present disclosure.

Carbon nanomaterials may be covalently modified using a number of reactions well known in the art, including reductive alkylation, dichlorocarbene addition, birch reduction, Bingel reactions, radical addition, ozonolysis, diazonium salt chemistry, and the like. Following the initial reaction, modified nanomaterials may be further modified to include additional functional groups, or reacted to attach other small molecules, oligomers, or polymers.

The addition of functional groups may generally improve the dispersibility of the nanomaterials in water or various oleaginous liquids. Such functional groups may include: alkyl, hydroxyl alkyl, amino alkyl, haloalkyl, alkenyl, alkynyl, sulfate, sulfonate, carboxy, benzenesulfonate, amines, alkyl amines, nitriles, quaternary amines, and the like. In addition, water or oil soluble polymers or polymerizable moieties may be grafted onto the surface of the nanomaterials.

Carbon nanomaterials within wellbore fluids are thermally stable at temperatures ranging as high as 325° C. or above and may be incorporated at 5 wt % or less in some embodiments. In yet another embodiment, carbon nanomaterials may be incorporated into wellbore fluids at 10% or less without introducing excessive viscosity and remain pumpable for downhole applications. In other embodiments, carbon nanomaterials may be incorporated at 3 wt % or less, or at 1 wt % or less, and/or as low as 0.001 wt %.

Carbon nanomaterials display strong absorption of a large range of electromagnetic radiation, including gamma, ultraviolet, microwave, and radio wave radiation, with subsequent light emission and heat release. While not adhering to any particular theory, carbon nanomaterials incorporated in the wellbore fluids of the present disclosure may exhibit dielectric loss, in which energy from incident radiation is transmitted as heat into the surrounding media, i.e. a wellbore fluid, filtercake, polymer, gel, etc. Emission of heat from irradiated carbon nanomaterials may be utilized, for example, to trigger polymerization of components in a wellbore fluid in a wellbore strengthening application, to aid in breaking of filtercakes or consolidated wellbore strengthening compositions formed on wellbore walls, and to disrupt fluid loss pills.

With this disclosure it has been found advantageous to use the heat generated from irradiated nanomaterials to trigger reactions within the wellbore such as the polymerization of thermosetting polymers, increase the mobility of viscous fluids, or the degradation of materials such as thermally-degradable polymers in filtercakes, fluid loss pills, and formation materials. In addition, carbon nanomaterials may be incorporated into breaker fluids used to remove filtercake from the walls of the wellbore. The use of electromagnetic irradiation as a means of generating heat to cure composites or degrade materials may be advantageous over other thermal methods, due to the high rate of heating and uniform temperature distribution throughout materials and fluids containing carbon nanomaterials.

Radiation Sources

As mentioned above, carbon nanomaterials may be provided in wellbore fluids to absorb radiation generated by a radiation source and in turn emit heat. A microwave radiation source, such as that described in U.S. Pat. Pub. 2009/0260818 and U.S. Pat. No. 6,214,175, or an equivalent UV radiation source such as described in U.S. Pat. Pub. 2010/0263867, which are incorporated by reference in their entirety, may be provided in the borehole for irradiation of wellbore fluids (or fluid residuals) containing carbon nanomaterials. It is also envisioned other compatible radiation sources may include those that emit a range of electromagnetic radiation, e.g. within the gamma to radiowave regions of the electromagnetic spectrum.

Figure 5:
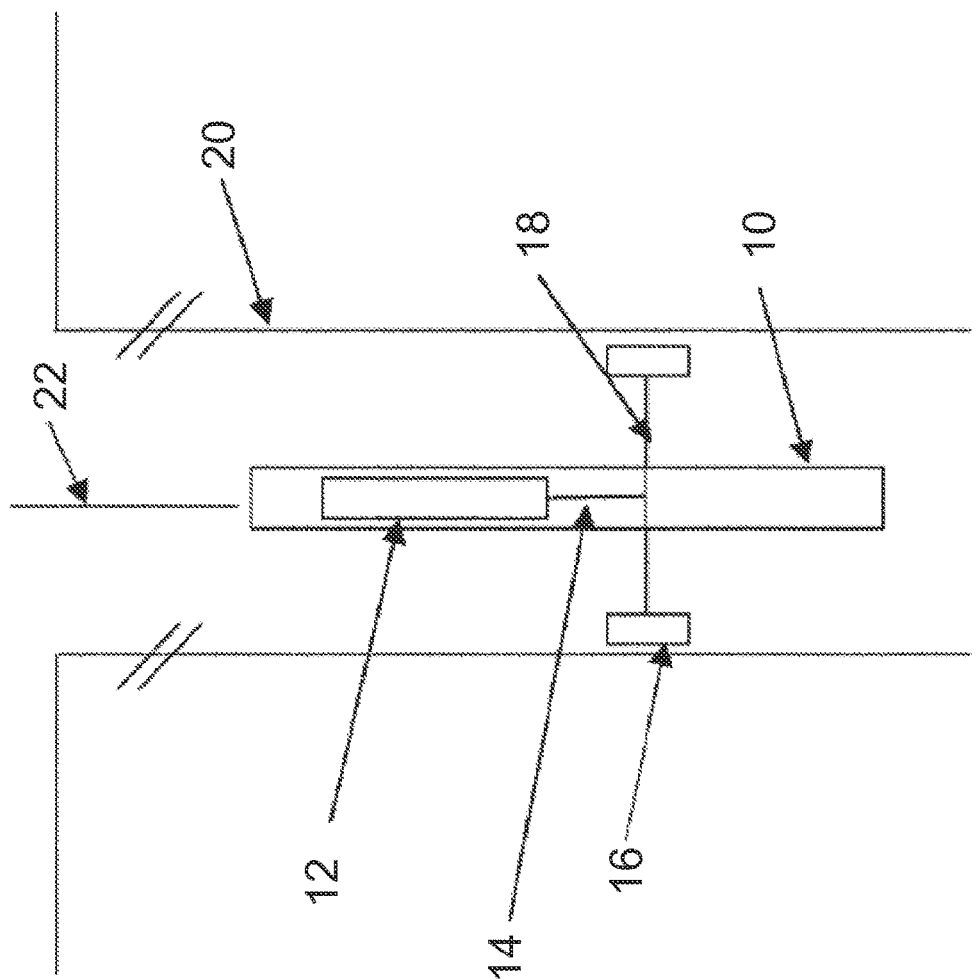
FIG. 5, is schematic detailing a downhole radiation source in accordance with embodiments disclosed herein.

In an embodiment, radiation may be delivered downhole by a tool equipped with a radiation source. Regarding in particular FIG. 5, a tool 10 may include a radiation source 12 that can be switched on or off, and which is connected, by means of a cable 14, to one or more transmitting antennae mounted on pads 16 at the ends of arms 18 which can be used to position the antennae 16 close to the borehole wall 20. The tool is placed downhole by means of a wireline cable 22 (other conveyance means such as drill pipe or coiled tubing can also be used), and is activated downhole when near a specific region within the wellbore. The tool may also be placed in a drill string above the bit, such that it irradiates during drilling.

The tool may have a plurality of articulatable and/or extendable arms 18. The arms 18 may be extended to touch the formation walls 20. The cable 14 may allow for the adjustment of the power of the microwaves emitted by the antennae 16 to achieve adequate levels of radiation emission downhole.

In other embodiments, the tool containing a radiation source may include tools such as those discussed in U.S. Patent Publication No. 2011/0183873, which is herein incorporated by reference in its entirety.

The tool containing a radiation source may be positioned in the desired region to be irradiated, and the microwave, radio wave, or UV source may be activated to irradiate said region. The microwave, radio wave, or UV source may be operated to vary the level of radiation used to irradiate the wellbore fluid (or residuals thereof). Optionally, two or more radiation sources may be separately lowered to two or more depths of the wellbore, such that two or more depths of the wellbore may be subject to radiation simultaneously.

In another embodiment, a radiation source may be disposed on a drilling assembly, for example on a plurality of pads that may contact the walls of the wellbore, such that a wellbore fluid containing carbon nanomaterials dispersed therein, is exposed to a selected wavelength of electromagnetic radiation as it flows up the annulus, heating a subterranean wellbore. In addition to heating the wellbore, the irradiation of the carbon nanomaterial may also initiate polymerization of a wellbore fluid, or degrade a filtercake that has been emplaced on the walls of a wellbore.

In yet another embodiment, the radiation source may be present within a drill string, such that the wellbore fluid containing carbon nanomaterials dispersed therein is exposed to a selected wavelength of electromagnetic radiation, heating the wellbore fluid as it exits the drill string.

As discussed above, the carbon nanomaterial may be incorporated into various types of wellbore fluids to heat said wellbore fluids. Various examples of when it might be beneficial to heat a wellbore fluid include fluids forming chemically sealing filtercakes, thermally degradable filtercakes or fluid loss pills, and wellbore fluids used to form composites for wellbore strengthening as a cement replacement. Each of these applications will be discussed in turn.

Carbon Nanomaterials for Wellbore Strengthening

Many wellbore strengthening compositions include polymerizable components/systems that polymerize and/or crosslink downhole. Polymerizing and/or crosslinking compositions may polymerize and/or crosslink in the wellbore, in an annular region of the well, in a selected interval of the well, or within a filtercake to create a chemical casing, or chemical lining, on the wellbore walls.

In an embodiment, radiation sensitizers comprising carbon nanomaterials, are mixed with a drilling fluid also containing crosslinkable and/or polymerizable species therein during the process of drilling a well, wherein the polymerizable and/or crosslinkable species may include any of the materials discussed below. Carbon nanomaterial sensitizers do not react with the drilling fluid while it is being pumped through the borehole, but may accumulate within the filtercake. The level of sensitizer in the drilling fluid may be adjusted so as to obtain a concentration in the filtercake sufficient to initiate cross-linking or polymerization of the polymerizable and/or crosslinkable species. Initiation of crosslinking and/or polymerization may be achieved by lowering a radiation source into the wellbore and irradiating the walls of the wellbore, and thus the carbon nanomaterials residing in the filtercake on the wellbore walls. Upon exposure to electromagnetic radiation, the carbon nanomaterials enhance the absorption of said radiation and heat the filtercake, which may initiate the polymerization and/or crosslinking of the polymerizable and/or crosslinkable species within the filtercake, creating a chemical casing appropriate for wellbore strengthening. Thus, in one aspect carbon nanomaterials added to a drilling fluid may advantageously become part of the filtercake, to in turn trigger chemical reactions that impart strength and durability to the filtercake, resulting in additional protection against fluid-loss.

Drilling fluids may include a base fluid (for example water, diesel or mineral oil, or a synthetic oleaginous fluid, or combinations thereof in an emulsion), weighting agents (for example, barite or calcium carbonate among others), and various additives that serve specific functions, such as polymer or clay viscosifiers, corrosion inhibitors, emulsifiers, and lubricants. Those having ordinary skill in the art will recognize that a number of different drilling fluids exist, and limitations on the present disclosure is not intended by reference to particular types. During drilling, the drilling fluid is injected through the center of the drill string to the drill bit and exits in the annulus between the drill string and the wellbore, fulfilling, in this manner, the cooling and lubrication of the bit, casing of the well, and transporting the drill cuttings to the surface. As the drilling fluid rises through the annulus, filtration of some of the fluid phase of the drilling fluid into the formation will result in a the formation of a filtercake on the wellbore walls, wherein the filtercake may also include residual fluids and solid additive components incorporated within the drilling fluid.

Further, drilling fluids may contain one or more natural and/or synthetic polymeric additives, including polymeric additives that increase the rheological properties (e.g., plastic viscosity, yield point value, gel strength) of the drilling fluid, polymeric thinners and flocculents. Polymeric additives included in the drilling fluid may also act as fluid loss control agents. Fluid loss control agents, such as starch, prevent the loss of fluid to the surrounding formation by reducing the permeability of filtercakes formed on the newly exposed rock surface. In addition, polymeric additives are often employed to impart sufficient carrying capacity and thixotropy to the fluid to enable the fluid to transport the cuttings up to the surface and to prevent the cuttings from settling out of the drilling fluid when circulation is interrupted.

The drilling fluids of the present disclosure may have an aqueous fluid as the base fluid. The aqueous fluid may include at least one of fresh water, sea water, brine, mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example.

In various embodiments, the drilling fluid may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

Embodiments of this disclosures may also include oil-based wellbore fluids or invert emulsions. Suitable oil-based or oleaginous fluids may be a liquid, in some embodiments it is a natural or synthetic oil and in some embodiments, the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof.

As discussed above, instead of obtaining wellbore strengthening by a chemical casing formed by a filtercake containing carbon nanomaterials that have been subsequently irradiated, the present disclosure also relates to formation of polymerized composites within the entire wellbore, a targeted interval of the wellbore, or annular region between the formation and a casing string, for example. Thus, carbon nanomaterials may be used in any of such polymerizable and/or crosslinkable systems which are triggered in some manner by heat.

In one or more embodiments, a wellbore fluid comprising carbon nanomaterials and polymer systems of the present disclosure may be emplaced into a wellbore or a region of the wellbore in which the wellbore fluid is desired to set or cure.

Polymerizable Systems

A wide variety of polymerizing systems suitable for use in wellbore strengthening are known in the art, such as latexes, epoxies, polyurethanes, and the like. Suitable monomers, oligomers, or prepolymers for the polymerizable systems include any molecules having polymerizable and/or crosslinkable functional groups. Monomers, oligomers, or crosslinkable polymers of the polymerizable and/or crosslinkable system may be hydrophilic or lipophilic based on their solubility in the selected wellbore fluid.

A variety of well known latex materials may be used as the monomer units in embodiments of the present disclosure. For example, natural rubber (cis-1,4-polyisoprene) and most of its modified types may be used. Synthetic polymers of various types may also be used, including polymers or copolymers of vinyl acetate, vinyl esters of fatty acids, esters of acrylic and methacrylic acids, amides of acrylic and methacrylic acids, acrylonitrile, styrene, vinyl chloride, vinylidene chloride, tetrafluoroethylene and other unsaturated olefin monomers.

Many epoxy compounds may be used in wellbore strengthening compositions in the present disclosure, and may be reacted with a curing agent or crosslinking agent as known in the art. Epoxy resins useful in polymerizable systems may include mono-functional epoxy resins, multi- or poly-functional epoxy resins, and combinations thereof. Monomeric and polymeric epoxy resins may be aliphatic, cycloaliphatic, aromatic, or heterocyclic epoxy resins. The polymeric epoxies may include linear polymers having terminal epoxy groups (a diglycidyl ether of a polyoxyalkylene glycol, for example), polymer skeletal oxirane units (polybutadiene polyepoxide, for example) and polymers having pendant epoxy groups (such as a glycidyl methacrylate polymer or copolymer, for example).

The epoxies may be pure compounds, but are generally mixtures or compounds containing one, two or more epoxy groups per molecule. In some embodiments, the epoxy resin may include glycidyl ether type; glycidyl-ester type; alicyclic type; heterocyclic type, and halogenated epoxy resins, etc. For example, such epoxy compounds may also include compounds such as ethylene glycol diglycidyl ether, propylene glycol diglycidyl ether, butylene glycol diglycidyl ether, sorbitol polyglycidyl ether, epoxy functionalized polyalkalene glycols, trimethylolpropane triglycidyl ether, diglycidyl ether of neopentyl glycol, epoxidized 1,6-hexanediol, 1,4-butanediol diglycidyl ether, 1,2,7,8-diepoxyoctane, 3-(bis(glycidoxymethyl)-methoxy)-1,2-propanediol, 1,4-cyclohexanedimethanol diglycidyl ether, 4-vinyl-1-cyclohexene diepoxide, 1,2,5,6-diepoxycyclooctane, and bisphenol A diglycidyl ether, or combinations thereof.

In other embodiments, the epoxy compounds may include epoxidized natural oils such as those discussed in U.S. Patent Publication No. 2007/0287767, which is assigned to the present assignee and herein incorporated by reference in its entirety. Non-limiting examples of suitable epoxy resins may include cresol novolac epoxy resin, phenolic novolac epoxy resin, biphenyl epoxy resin, hydroquinone epoxy resin, stilbene epoxy resin, and mixtures and combinations thereof.

In some embodiments, epoxy resins may also include reactive hydroxyl groups, which may react at higher temperatures with anhydrides, organic acids, amino resins, phenolic resins, or with epoxy groups (when catalyzed) to result in additional crosslinking Other suitable epoxy resins are disclosed in, for example, U.S. Pat. Nos. 7,727,938, 7,163,973, 6,632,893, 6,242,083, 7,037,958, 6,572,971, 6,153,719, and 5,405,688, U.S. Patent Publication Nos. 20060293172, 20050171237, 200806912, 2008062921, 20070249504, and international documents WO/2009/106987, and WO/2010/015639, each of which is hereby incorporated herein by reference.

To initiate polymerization, the epoxy compounds may be reacted with any nucleophile, such as carbanions or heteroatoms including amines, alcohols, phenols, thiols, and carboxylates. It is noted that examples of compounds may include lignin, lignosulfonates, tannins, tannic acids, biopolymers, natural polymers, polyamines, polyetheramines, polyvinyl amines and polyethylene imines. Further, instead of epoxy containing compounds, it is noted that aziridine-containing compounds may react similar to epoxy-containing compounds with a ring-opening reaction to similar classes of nucleophiles.

Polyisocyanates may be reacted with amines or alcohols to form polyurethanes and polyureas downhole. In addition, polyisocyanates may multimerize to form biuret or isocyanurate ring linkages between monomers. Examples of polyurethane-forming compounds that may be used in the present disclosure include polyisocyanates, such as aliphatic, alicyclic, aromatic or araliphatic diisocyanate compounds. Aliphatic polyisocyanates may include hexamethylene diisocyanate, trimethylhexamethylene diisocyanate, dimeric acid diisocyanate, lysine diisocyanate and the like, and biuret-type adducts and isocyanurate ring adducts of these polyisocyanates. Alicyclic diisocyanates may include isophorone diisocyanate, 4,4'-methylenebis(cyclohexylisocyanate), methylcyclohexane-2,4- or -2,6-diisocyanate, 1,3- or 1,4-di(isocyanatomethyl)cyclohexane, 1,4-cyclohexane diisocyanate, 1,3-cyclopentane diisocyanate, 1,2-cyclohexane diisocyanate, and the like, and biuret-type adducts and isocyanurate ring adducts of these polyisocyanate. Aromatic diisocyanate compounds may include xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluydine diisocyanate, 4,4'-diphenyl ether diisocyanate, m- or p-phenylene diisocyanate, 4,4'-biphenylene diisocyanate, 3,3'-dimethyl-4,4'-biphenylene diisocyanate, bis(4-isocyanatophenyl)-sulfone, isopropylidenebis (4-phenylisocyanate), and the like, and biuret type adducts and isocyanurate ring adducts of these polyisocyanates. Polyisocyanates having three or more isocyanate groups per molecule may include, for example, triphenylmethane-4,4', 4''-triisocyanate, 1,3,5-triisocyanato-benzene, 2,4,6-triisocyanatotoluene, 4,4'-dimethyldiphenylmethane-2,2',5,5'-tetraisocyanate, and the like, biuret type adducts and isocyanurate ring adducts of these polyisocyanates. Additionally, isocyanate compounds used herein may include urethanation adducts formed by reacting hydroxyl groups of polyols such as ethylene glycol, propylene glycol, 1,4-butylene glycol, dimethylolpropionic acid, polyalkylene glycol, trimethylolpropane, hexanetriol, and the like with the polyisocyanate compounds, and biuret type adducts and isocyanurate ring adducts of these polyisocyanates.

The present disclosure may also be applied to thermally responsive elastomer-forming compositions such as blocked isocyanates, which are disclosed in U.S. Pat. Nos. 4,374,771 and 7,504,518 and U.S. Patent Publications 2010/00939002 and 2010/0087566 incorporated here by reference. Other isocyanate blocking agents are described in, for example, U.S. Pat. Nos. 6,288,176, 5,559,064, 4,637,956, 4,870,141, 4,767,829, 5,108,458, 4,976,833, and 7,157,527, U.S. Patent Application Publication Nos. 2005/0187314, 2007/0023288, 2007/0009750, 2006/0281854, 2006/0148391, 2006/0122357, 2004/0236021, 2002/0028932, 2003/0194635, and 2003/0004282, each of which is incorporated herein by reference. Further, one of ordinary skill in the art would appreciate that mixtures of isocyanate blocking agents may also be used.

Isocyanates may be chemically inactivated, or "blocked," to allow wellbore fluids containing blocked isocyanates to be emplaced prior to polymerization and/or crosslinking Upon exposure to heat, such as that released from carbon nanomaterials during irradiation with a radiation source, for example, the blocked isocyanates may become "unblocked," or activated, releasing an active isocyanate functional group capable of forming polyurea or polyurethane downhole. In another embodiment, polyurethanes or polyureas (or other elastomers such as polysulfides, polyethers, polysiloxanes, polybutadienes, and polyisoprenes) may be reacted downhole with a curing agent or a crosslinking agent. Such types of downhole polymerization and the components used may be described in more detail in U.S. Pat. Pub. Nos. 2010/012094 and 2010/0087566, which are assigned to the present assignee and are incorporated herein by reference in their entirety.

Additionally, polyisocyanates may be decarboxylated to form carbodiimides, which may react with any compounds containing an active hydrogen, such as amines, carboxylic acids, sulfonic acids, phosphoric acids, or hydroxyl groups, which is described in WO2011/039544 which is assigned to the present assignee and herein incorporated by reference in its entirety.

Further, one or more of the above chemistries or other chemistries not specifically mentioned may be reacted upon exposure to an initiator. In particular embodiments, the initiator may be thermally activated, such as by the heat emitted from the carbon nanomaterials of the present disclosure.

In embodiments, the polymers and/or monomers are contacted with at least one initiator in order to effect the formation of the composite. For electrophilic polymerizable species, for example epoxides and isocyanates, the initiator may be any nucleophilic or electrophilic group that may react with the reactive groups available in the polymers and/or monomers. In further embodiments, the initiator may comprise a polyfunctional molecule with more than one reactive group. Such reactive groups may include for example, amines, alcohols, phenols, thiols, carbanions, organofunctional silanes, carboxylates, sulfonates, sulfates, or phosphate groups.

Free-radical initiators that may be used in forming polymeric compositions include the hydroperoxy curing agents and organic curing agents having the formula ROOH, wherein R generally is the hydrocarbon radical containing up to about 18 carbons, desirably an alkyl, aryl or aralkyl radical containing up to about 12 carbon atoms. When warmed to a specific temperature, peroxide curing agents decompose exothermically into free radicals with a half-life period which is characteristic for each peroxide. In the presence of polymerizable double bonds, these free radicals add themselves on thereto and initiate the polymerization.

Examples of such hydroperoxides include cumene hydroperoxide, methylethylketone hydroperoxide, paramethane hydroperoxide, tertiary butyl hydroperoxide as well as hydroperoxides formed by the oxygenation of various other hydrocarbons such as methylbutene, cetane and cyclohexane. Other peroxy initiators such as hydrogen peroxide or materials such as organic peroxides or peresters which hydrolyze or decompose to form hydroperoxides such as tertiary butyl perbenzoate may also be employed. Organic peroxides, for example percarbonates, diacyl peroxides, peresters, per-acids or ketone hydroperoxides, are used to a great extent as initiators for free-radical polymerization.

Crosslinkers capable of linking multiple polymer chains may also be used depending on the density of the polymer network desired within the filtercake or consolidated composite. Depending on the polymerization system utilized crosslinkers may contain multiple nucleophilic moieties, such as polyamines, polyhydric alcohols, or polyalcohols; multiple electrophilic moieties, such as dialdehydes; or multiple alkenyl groups, such as methylene bisacrylamide. Also, crosslinking of oligomers or macromers may also be of interest. Systems that include oligomers or macromers include, for example, poly(ethylene glycol) or poly(dimethylallylammonium chloride). The particular chemical system chosen will depend on the particular drilling fluid system being used, the degree of support that may be needed once polymerized, etc.

Thus, any of such polymerizable systems may be incorporated within a drilling fluid that forms a filtercake, which may subsequently be triggered to polymerize and/or crosslink by the heat generated from the carbon nanomaterials of the present disclosure. As mentioned above, the carbon nanomaterials may be present in the drilling fluid and thus the filtercake formed within the wellbore. In another embodiment, a completion fluid may displace the drilling fluid within the well and the radiation source may be lowered into the wellbore to emit radiation that is absorbed by the carbon nanomaterials. The polymerizable species may also be present in the drilling fluid (and thus the filtercake upon filtration of the fluid into the formation), and the carbon nanomaterials may be present in a completion fluid that displaces the drilling fluid and into which the radiation source is lowered.

While many embodiments have been described, the electromagnetic radiation sensitizers of this disclosure may also be used to accelerate polymerization of any heat-curable or thermosetting polymer composition not present in a filtercake upon exposure to a radiation source. Such methods may include emplacing a wellbore fluid containing polymerizable and/or crosslinkable species such as those described above in a wellbore, in a desired interval of the well, or in an annular region between the formation and a tubular string. Carbon nanomaterials of the present disclosure may be incorporated within the wellbore fluid containing the polymerizable and/or crosslinkable species. A tool containing a radiation source, such as those described above, may be lowered into the wellbore adjacent to, or within the vicinity of, the wellbore fluid containing the nanomaterials and emit radiation such as microwave or UV radiation. The carbon nanomaterial may absorb that spectrum of radiation and in turn emit heat, triggering the polymerization and/or crosslinking of the polymerizable and/or crosslinkable species within the wellbore fluid. It is also envisioned that the carbon nanomaterials may be dispersed instead in a second wellbore fluid that is adjacent to, or in the vicinity of, the wellbore fluid containing the polymerizable and/or crosslinkable species and still sufficiently heat the fluid containing the polymerizable and/or crosslinkable species to trigger polymerization and/or crosslinking. For example, it is envisioned that the carbon nanomaterials may be in a fluid within the tubular string while the polymerizable fluid is in an annular region outside the tubular string formed by the wellbore walls.

Carbon Nanomaterials as Breaker Fluid Additives

In another aspect, embodiments disclosed herein relate to a method of cleaning a wellbore having a filtercake or fluid loss pill therein. Thus, this embodiment involves multiple wellbore fluids, a drilling fluid that forms a filtercake or fluid loss pill within a wellbore, and a breaker fluid that breaks or disrupts the filtercake or fluid loss pill, wherein electromagnetic radiation sensitizers comprising carbon nanomaterials are dispersed within either or both of the wellbore fluids. Upon emplacement of either and/or both fluids within a wellbore, a radiation source is then lowered into the wellbore and operated for a period of time sufficient to initiate breaking of the filtercake or fluid loss pill and removal of other non-formation materials.

Fluid loss pills are often used during completion operations, when fluid loss is suspected. Specifically, a fluid loss pill including a wellbore fluid, any of the above polymer compositions, and a carbon nanomaterial may be "spotted" into the wellbore to reduce or prevent such fluid loss. During placement or spotting of the fluid loss pill, the polymer/carbon nanomaterial composition is injected into the wellbore to a position which is immediately above a portion of the formation where fluid loss is suspected. Completion fluids are then pumped behind the fluid loss pill to push it into position. Injection of fluids into the wellbore is then stopped, and fluid loss will then move the pill toward the fluid loss location.

The filtercake and/or fluid loss pill may include a temperature-degradable polymer therein so that during completion operations, a radiation source may be lowered into the wellbore and activated, whereby the carbon nanomaterials cause increased radiation absorption and localized heating, degrading the temperature-degradable polymer, thereby destabilizing the filtercake and/or fluid loss pill, aiding in removal prior to well production operations.

Temperature-degradable natural polymers used in such applications, may include various polysaccharide polymers such as starch derivatives, cellulose derivatives, and biopolymers, including hydroxypropyl starch, hydroxyethyl starch, carboxymethyl starch, and their corresponding lightly crosslinked derivatives; carboxymethyl cellulose, hydroxyethyl cellulose, hydroxypropyl cellulose, methyl cellulose, dihydroxypropyl cellulose, and their corresponding lightly crosslinked derivatives; xanthan gum, gellan gum, welan gum and schleroglucan gum.

Other examples of temperature-degradable polymers, as described in U.S. Pat. Pub. 2005/0205266, include chitin; chitosans; proteins; aliphatic polyesters; poly(lactides); poly (glycolides); poly(e-caprolactones); poly(hydroxybutyrates); poly(anhydrides); aliphatic polycarbonates; poly (orthoesters); poly(amino acids); poly(ethylene oxides); and polyphosphazenes.

Carbon nanomaterials may either be incorporated into the filtercake-forming drilling fluid, or fluid loss pill or the breaker fluid used to clean up the residual filtercake or fluid loss pill prior to producing the well. The presence of the carbon nanomaterial sensitizers in the breaker fluid, filtercake, or fluid loss pill aid in the degradation and removal of said residual fluid. Upon completion of operations, a radiation source may be lowered into the wellbore and activated to initiate the disruption of the filtercake or fluid loss pill. Specifically, raising the temperature of the filtercake, fluid loss pill, or region of the wellbore adjacent thereto, to a temperature sufficient to degrade the temperature degreadable polymers therein allows for easier removal of the broken materials from the well.

In addition to carbon nanomaterials, the breaker fluids may also include acids, enzymes, oxidizers, or other solvents that are conventionally used to break filer cakes, fluid loss pills, or gravel packs. Examples of acids that may be used a breaker fluid include strong mineral acids, such as hydrochloric acid or sulfuric acid, and organic acids, such as citric acid, lactic acid, malic acid, acetic acid, and formic acid. In addition, acid sources may include delayed acid sources such as hydrolysable esters of carboxylic acids, anhydrides, sulfonic acids, phosphoric acids, etc. Upon hydrolysis of the ester of an acid, the acid may be released to help break acid-degradable components such as calcium carbonate or aid in destabilizing an emulsion in the case of a filtercake being formed by an invert emulsion fluid.

In other embodiments, a breaker fluid may include a natural polymer degrading enzyme, for example, a carbohydrase. Examples of such enzymes include amylases, pullulanases, and cellulases. In yet another embodiment, the breaker fluid may include an oxidizing agent, such as sodium hypochlorite or peroxides. Various breaker fluids and compositions are known in the art and examples are disclosed in Patent Publications 2004/0040706, 2005/0161219, and 2010/0300967, which are incorporated herein by reference. Any such breaker fluid known in the art may be used in the present disclosure in conjunction with the heat generated form the carbon nanomaterials to aid in degradation of the filtercake, fluid loss pill, or gravel pack, i.e. any residual fluids of a previous wellbore operation.

Further, in some embodiments, the carbon nanomaterials of the present disclosure may be used in wells that have been gravel packed. For example, as known to those skilled in the art, gravel packing involves pumping into the well (and placing in a production interval) a carrier fluid (conventionally a viscoelastic fluid) that contains the necessary amount of gravel to prevent sand from flowing into the wellbore during production. However, filtercake remaining on the walls and the viscoelastic carrier fluid must be removed prior to production. In a particular embodiment, after placement of a gravel pack, a breaker fluid containing a nanomaterial radiation sensitizer of the present disclosure may be emplaced in the wellbore, followed by the introduction of a radiation source to initiate removal of the filtercake and other non-formation materials. It may also be envisioned that the carbon nanomaterials are included within the gravel pack formulation and activated in the presence of the breaker fluid and radiation source when removing the gravel pack.

EXAMPLES

Example 1

Carbon Nanomaterials in Aqueous Solvents

The ability of various carbon nanomaterials to increase the microwave absorption and heating of aqueous solvents was determined by preparing solutions containing selected nanomaterials and exposing the sample to microwave radiation in a custom waveguide.

Samples were prepared from a 1 wt % mixture of the carbon nanomaterial in water and/or 1 wt % of pre-solubilized sodium dodecyl benzene sulfonate (SDBS) dispersant. A number of samples were prepared from multi-walled nanotubes obtained from different suppliers, including multi-walled carbon nanotubes from Mitsui, Bayer, Nanotech Labs, Hyperion, MTR Ltd., NANOCS Inc., NANOSYL S.A., Nanolab, Nano NB, NANOSHEL, Rosetter Holdings Ltd., SES Research, Shenzhen Nanotech Port Co. Ltd., SunNano, TECO Nanotech Co. Ltd., and Xintek Inc., were compared to graphite (available from Sigma Aldrich), conductive carbon black (CCB) (available from Continental Carbon), and control reactions prepared from water and 1 wt % SDBS in water.

Following preparation of the sample mixtures, the samples were sonicated for 1 hour at room temperature in a bath sonicator. The suspension was then ultrasonciated with a probe-type ultrasonicator (Cole Parmer 750W Ultrasonic Homogenizer) at 50% amplitude for 10 minutes while alternating 45 second pulses with 15 second pauses. The suspension was then allowed to cool to room temperature.

Samples were then transferred to a 600 W microwave heater and the temperature was monitored as a function of time until the samples reached 100° C. Temperature vs. time curves for samples assayed are plotted in FIG. 1. When comparing the time to heat a system to a given temperature, aqueous suspensions of the carbon nanomaterials show increased heating rates when compared to the water control.

Example 2

Carbon Nanomaterials in Ionic Liquids

The ability of the carbon nanomaterials to increase the rate of heating of ionic liquids upon exposure to microwave radiation was also measured. Carbon nanomaterials were dispersed in ionic liquids at 1 wt % by grinding the sample with an agate mortar and pestle for 15 minutes in Cola®Solv, a quaternary imidazolium sulfate ionic liquid available from Colonial Chemical.

Figure 2:
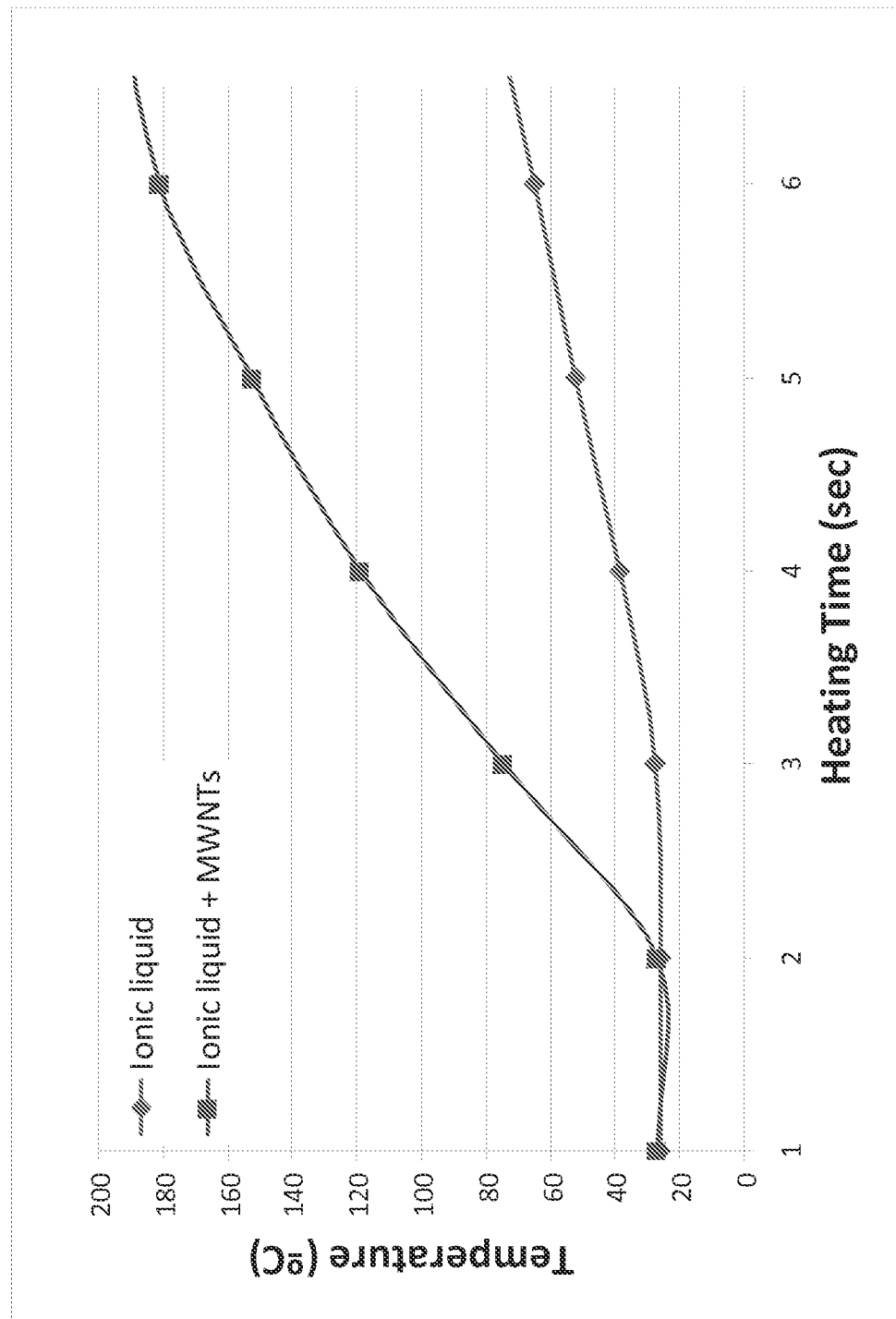

Samples were then placed within a 600 W microwave heater. Temperature was then recorded as a function of time until the samples reached 200° C. Results are plotted as temperature vs. time in FIG. 2. Within these experiments the carbon nanomaterials exhibit a roughly threefold decrease in heating times when compared to an ionic liquid control.

Example 3

Carbon Nanomaterials in Oil-Based Fluid Formulations

Figure 3:
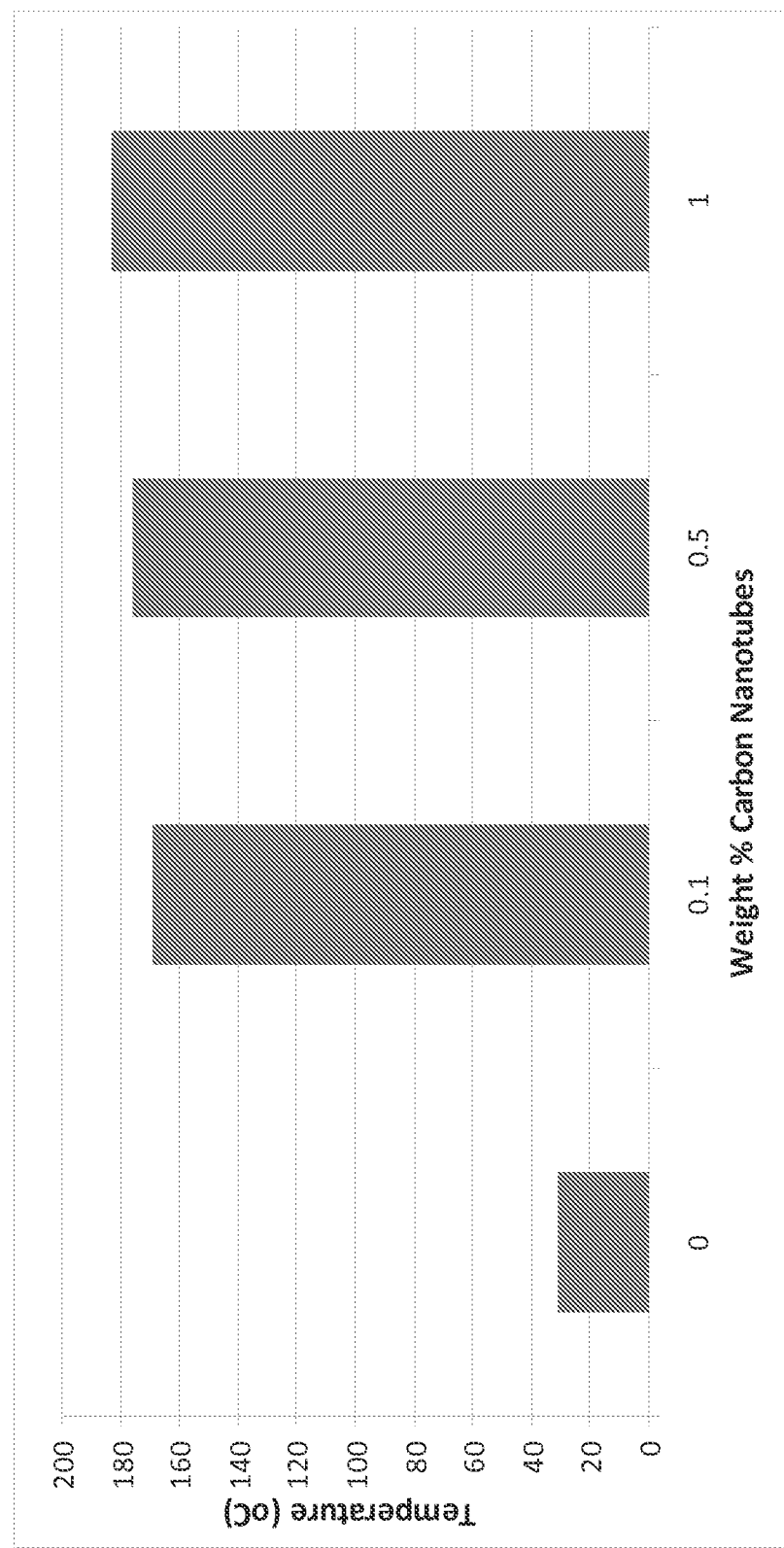

In this example, the change in microwave absorption and heating characteristics of a non-aqueous fluid was studied by dispersing multi-walled carbon nanotubes at varying percent by weight in mineral oil without a surfactant. Following dispersion in mineral oil, samples were then transferred to a 50 W microwave and heated for 5 minutes. The resulting temperature was recorded and plotted in FIG. 3.

Example 4

Carbon Nanomaterials in Oil-Based Mud Formulations

An oil-based wellbore fluid was prepared formulated as shown in Table 1 using mineral oil, Ganex® 216 an alkylated polyvinyl pyrrolidone polymer surfactant available from Ashland (Wayne, N.J.), multi-walled nanotubes (MWNTs). VG-PLUS™ clay viscosifier, ONE MUL™ emulsifier, and ONE-TROL™ fluid loss control additive, are all commercially available from M-I (Houston, Tex.). Mud formulations are shown in Table 1.

Figure 4:
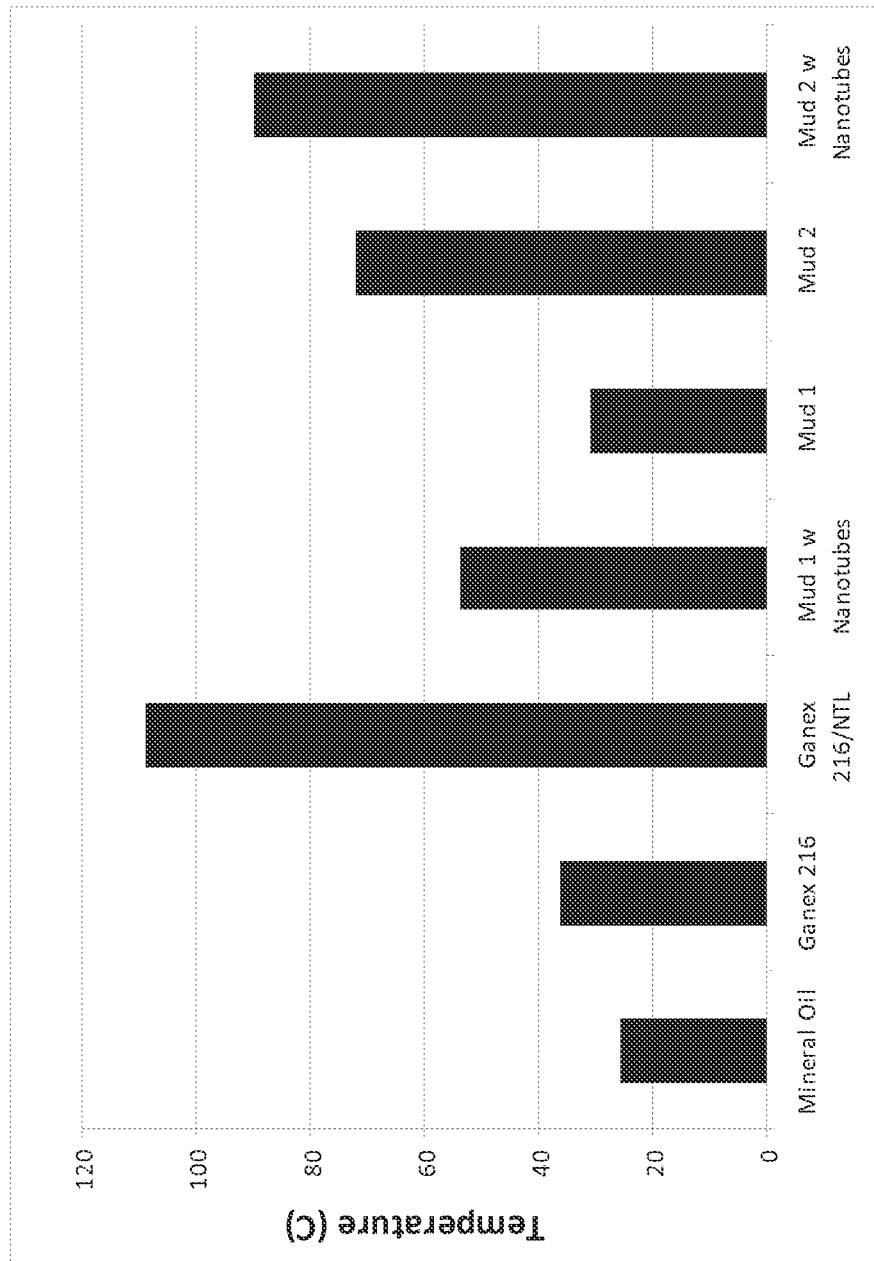

All components were added and combined with a Hamilton Beach mixer and sheared using a Silverson model L5M-A for 5 min at 6000 RPM. The muds were heated at 150° F. for 16 hours then cooled to room temperature. Rheological measurements were then obtained on a Fann 35 viscometer at 150° F. and tabulated as shown in Table 2. Samples were then transferred to a 50 W microwave and heated for 5 minutes. Final temperatures for the samples were recorded and plotted in FIG. 4.

TABLE 1

Formulations for oil-based wellbore fluids used in Example 4.

| Additive | Density (g/cm³) | Mud 1 | Mud 1 + MWNTs | Mud 2 | Mud 2 + MWNTs |
|---|---|---|---|---|---|
| Mineral oil (ppb) | 0.81 | 168 | 167 | 168 | 167 |
| Ganex ® V216 (ppb) | — | 1.78 | 1.78 | — | — |
| MWNT (ppb) | 1.3 | — | 1.78 | — | 1.78 |
| VG-PLUS ™ (ppb) | 1.57 | 5 | 5 | 5 | 5 |
| ONE MUL ™ (ppb) | 0.94 | 8 | 8 | 8 | 8 |
| ONETROL ™ (ppb) | 1.13 | 4 | 4 | 4 | 4 |
| Lime (ppb) | 2.34 | 5 | 5 | 5 | 5 |
| CaCl₂ brine (ppb) | 1.24 | 19.23 | 19.23 | 19.2 | 19.2 |
| Water (ppb) | 1 | 53.8 | 53.8 | 53.8 | 53.8 |
| Barite (ppb) | 4.2 | 231.4 | 231.4 | 234 | 234 |

TABLE 2

Rheological data for oil-based formulations used in Example 4 at 150° F.

| | Mud 1 | Mud 1 + MWNTs | Mud 2 | Mud 2 + MWNTs |
|---|---|---|---|---|
| 600 RPM (cP) | 10 | 25 | 32 | 82 |
| 300 RPM (cP) | 5 | 13 | 19 | 54 |
| 200 RPM (cP) | 3 | 9 | 14 | 43 |
| 100 RPM (cP) | 2 | 5 | 9 | 31 |
| 6 RPM (cP) | 1 | 1 | 4 | 14 |
| 3 RPM (cP) | 1 | 1 | 3 | 12 |
| GELS 10" (lbs/100 ft²) | 1 | 1 | 5 | 14 |
| GELS 10' (lbs/100 ft²) | 3 | 2 | 5 | 17 |
| PLASTIC VISC. (cP) | 5 | 12 | 13 | 28 |
| YIELD POINT (lbs/100 ft²) | 0 | 1 | 6 | 26 |
| Density (g/cm³) | 11.82 | 11.84 | 11.82 | 11.84 |

Example 5

Heating Effects of Carbon Nanomaterials

An oil-based wellbore fluid was prepared as shown in Table 3 using BioBase™ 360 base fluid commercially available from Shrieve Chemical Products (The Woodslands, Tex.), Lime, 30% calcium chloride brine, MWNTs, Dehylube™ 1316 ester based lubricant commercially available from Emery, VG Plus™ organophilic clay, ONE-MUL™, RHEFLAT™ Plus polymeric rheology modifier, ECOTROL RD™ filtration control additive, and M-I WATE™ high quality barium sulfate, all commercially available from M-I SWACO (Houston, Tex.).

TABLE 4

Formulations for oil-based wellbore fluids used in Example 5.

| PRODUCT | UNITS | Density | Control | 0.2% MWNT | 0.5% MWNT | 2% MWNT |
|---|---|---|---|---|---|---|
| BioBase ™ 360 | ppb | 0.78 | 152 | 152 | 152 | 152 |
| VG Plus ™ | ppb | 2.16 | 8 | 8 | 8 | 8 |
| Lime | ppb | 1.5 | 3 | 3 | 3 | 3 |
| ONE-MUL ™ | ppb | 0.9 | 10 | 10 | 10 | 10 |
| RHEFLAT ™ Plus | ppb | 0.9 | 2 | 2 | 2 | 2 |
| 30% CaCl₂ Brine* | ppb | 1.298 | 114 | 114 | 114 | 114 |
| Ecotrol RD ™ | ppb | 1.03 | 2 | 2 | 2 | 2 |
| Dehylube ™ 1316 | ppb | 0.98 | 10.5 | 10.5 | 10.5 | 10.5 |
| M-I WATE ™ | ppb | 4.12 | 138 | 138 | 138 | 138 |
| MWCNT | ppb | 1.2 | 0 | 0.7 | 1.8 | 7 |
| Volume | | | 348 | 348 | 349 | 354 |
| Grams | | | 440 | 440 | 441 | 447 |
| Density | | | 11 | 11 | 11 | 11 |
| OWR | | | 0.69 | 0.69 | 0.69 | 0.69 |

All components were added and combined with a Hamilton Beach mixer and sheared using a Silverson model L5M-A for 5 min at 6000 RPM. The muds were heated at 150° F. for 16 hours then cooled to room temperature. Rheological measurements were then obtained on a Fann 35 viscometer at 150° F. and tabulated as shown in Table 4.

TABLE 5

Formulations for oil-based wellbore fluids used in Example 5

| | | Control | 0.2% MWNT | 0.5% MWNT | 2% MWNT |
|---|---|---|---|---|---|
| RHEOLOGY: (AHR) | | 150 | 150 | 150 | 150 |
| 600 RPM | | 69 | 75 | 83 | 204 |
| 300 RPM | | 46 | 52 | 60 | 163 |
| 200 RPM | | 37 | 43 | 51 | 143 |
| 100 RPM | | 28 | 35 | 41 | 120 |
| 6 RPM | | 19 | 24 | 31 | 76 |
| 3 RPM | | 19 | 25 | 30 | 53 |
| GELS 10" | | 20 | 25 | 32 | 73 |
| GELS 10' | | 24 | 27 | 48 | 74 |
| PLASTIC VISC. | | 23 | 23 | 23 | 41 |
| YIELD POINT | | 23 | 29 | 37 | 122 |
| ES | 150 | 304/289 | 306/354 | 340 | 32 |
| HTHP Filtration | 250 | 2.4 | 1.8 | 2 | 6.4 |

Samples were then transferred to a 50 W Wave Guide microwave and heated for 5 minutes. The results are presented in Table 6, and show an increase in temperature as the concentration of MWNTs are increased in the formulation.

TABLE 6

Microwave heating of formulations used in Example 5.

|  | Control | 0.2% MWNT | 0.5% MWNT | 2% MWNT |
|---|---|---|---|---|
| Start Temp ° C. | 27.2 | 25.7 | 22.3 | 22.0 |
| Final Temp ° C. | 58.5 | 60.3 | 84.4 | 106.6 |
| ΔTemp ° C. | 31.3 | 34.6 | 62.1 | 84.6 |

Advantageously, embodiments of the present disclosure may include wellbore fluids and compositions possessing an enhanced heating response to applied electromagnetic radiation, decreasing heating times and potentially decreasing the amount of radiation and energy needed for downhole operations. Furthermore, incorporation of the nanomaterials into wellbore fluids may allow for shorter polymerization and/or degradation times, leading to greater control of wellbore consolidation applications.

Wellbore fluids of this disclosure may also become less viscous upon exposure to a electromagnetic radiation source, which may also increase wellbore pressure and fluid mobility. The decrease in viscosity may allow wellbore fluids to penetrate further into the formation during heating, delivering fluid loss additives or proppants in order to block and mechanically stabilize fractures.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method of triggering heating within a subterranean formation, comprising:
   injecting a fluid loss pill into a wellbore;
   introducing a wellbore fluid comprising a carbon nanomaterial dispersed therein into the wellbore;
   lowering a microwave, radio wave, or ultraviolet radiation source into the wellbore; and
   irradiating the wellbore with microwave or ultraviolet radiation, thereby increasing the temperature of the wellbore fluid and wellbore,
   wherein the fluid loss pill comprises temperature-degradable polymer.

2. The method of claim 1, wherein the carbon nanomaterial is one or more selected from the group consisting of graphite, single-walled carbon nanotubes, multi-walled carbon nanotubes, graphene, graphene oxide, carbon black, glassy carbon, carbon nanofoam, silicon carbide, buckminsterfullerene, buckypaper, nanofiber, nanoplatelets, nano-onions, nanoribbons, nanohorns, nano-hybrids, and derivatives thereof.

3. The method of claim 1, wherein the wellbore fluid comprises temperature-degradable polymers.

4. The method of claim, 1, further comprising drilling the wellbore with a drilling fluid and forming a filtercake prior to injecting the fluid loss pill into the wellbore.

5. The method of claim 1, wherein the wellbore fluid injected into the wellbore further comprises at least one polymerizable species and/or a crosslinkable species.

6. The method of claim 5, wherein irradiating the wellbore fluid forms a polymer or gel capable of strengthening the wellbore.

7. The method of claim 5, wherein the wellbore fluid comprising at least one polymerizable species and/or a crosslinkable species is injected through the wellbore into an annular region outside a tubular string placed within the wellbore.

8. The method of claim 5, further comprising allowing the wellbore fluid comprising at least one polymerizable species and/or a crosslinkable species to filter into the formation forming a filtercake.

9. The method of claim 8, wherein irradiating the wellbore forms a chemical casing.

10. The method of claim 1, further comprising injecting a fluid comprising at least one polymerizable and/or crosslinkable species into the subterranean formation, wherein the carbon nanomaterial is dispersed in the at least one polymerizable and/or crosslinkable species.

11. The method of claim 1, wherein the wellbore fluid further comprises at least one polymerizable and/or crosslinkable species dispersed therein.

12. The method of claim 11, further comprising drilling the wellbore with the wellbore fluid.

13. A method of triggering heating within a subterranean formation, comprising:
   drilling a wellbore with a drilling fluid comprising temperature-degradable polymers that forms a filtercake;
   introducing a wellbore fluid comprising a carbon nanomaterial dispersed therein into the wellbore;
   lowering a microwave, radio wave, or ultraviolet radiation source into the wellbore; and
   irradiating the wellbore with microwave or ultraviolet radiation, thereby increasing the temperature of the wellbore fluid and wellbore.

14. A method of triggering heating within a subterranean formation, comprising:
   injecting a fluid comprising at least one polymerizable and/or crosslinkable species into the subterranean formation;
   introducing a wellbore fluid comprising a carbon nanomaterial dispersed therein into a wellbore;
   lowering a microwave, radio wave, or ultraviolet radiation source into the wellbore; and
   irradiating the wellbore with microwave or ultraviolet radiation, thereby increasing the temperature of the wellbore fluid and wellbore.

15. The method of claim 14, further comprising allowing the fluid comprising at least one polymerizable species and/or a crosslinkable species to filter into the formation forming a filtercake.

16. The method of claim 15, further comprising displacing the remaining fluid comprising at least one polymerizable and/or crosslinkable species that has not formed a filtercake with the wellbore fluid comprising a carbon nanomaterial dispersed therein.

17. The method of claim 16, wherein irradiating the wellbore fluid comprising a carbon nanomaterial dispersed therein increases the temperature of the wellbore and/or the wellbore fluid to a temperature sufficient to initiate polymerization and/or crosslinking of the polymerizable and/or crosslinkable species within the wellbore fluid and/or filtercake.

18. The method of claim 17, wherein the fluid comprising at least one polymerizable species and/or a crosslinkable species is injected through the wellbore into an annular region outside a tubular string placed within the wellbore.

* * * * *